US012606172B2

(12) United States Patent
Balachandran et al.

(10) Patent No.: US 12,606,172 B2
(45) Date of Patent: Apr. 21, 2026

(54) AUTOMATED CONTROL ARCHITECTURE THAT HANDLES BOTH GRIP DRIVING AND SLIDING

(71) Applicant: TOYOTA RESEARCH INSTITUTE, INC., Los Altos, CA (US)

(72) Inventors: Avinash Balachandran, Sunnyvale, CA (US); Yan Ming Jonathan Goh, Palo Alto, CA (US); John Subosits, Menlo Park, CA (US); Michael Thompson, San Juan Capistrano, CA (US); Alexander R. Green, Redwood City, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 785 days.

(21) Appl. No.: 17/377,323

(22) Filed: Jul. 15, 2021

(65) Prior Publication Data
US 2023/0022906 A1    Jan. 26, 2023

(51) Int. Cl.
B60W 30/182 (2020.01)
B60R 16/023 (2006.01)
(Continued)

(52) U.S. Cl.
CPC ....... B60W 30/182 (2013.01); B60R 16/0232 (2013.01); B60W 10/02 (2013.01); B60W 10/04 (2013.01); B60W 10/18 (2013.01); B60W 10/20 (2013.01); B60W 50/0205 (2013.01); B60W 50/029 (2013.01); G06N 20/00 (2019.01); B60W 2710/18 (2013.01)

(58) Field of Classification Search
CPC .... B60W 30/182; B60W 10/02; B60W 10/04; B60W 10/18; B60W 10/20; B60W 50/0205; B60W 50/029; B60W 2710/18; B60W 2050/0008; B60W 2720/16; B60W 2720/20; B60W 10/184; B60W 30/045; B60W 50/082; B60W 10/06; B60R 16/0232; G06N 20/00
See application file for complete search history.

(56) References Cited

U.S. PATENT DOCUMENTS

| | | | |
|---|---|---|---|
| 5,480,219 | A | 1/1996 | Kost |
| 8,521,349 | B2 | 8/2013 | Yu |

(Continued)

OTHER PUBLICATIONS

Handbrake Turn, Jul. 19, 2023, Wikipedia, https://en.wikipedia.org/wiki/Handbrake_turn#:~:text=Whereas%20pulling%20the%20handbrake%20is,require%20a%20three%2Dpoint%20turn (Year: 223).*

(Continued)

*Primary Examiner* — Hunter B Lonsberry
*Assistant Examiner* — Harrison Heflin
(74) *Attorney, Agent, or Firm* — SHEPPARD, MULLIN, RICHTER & HAMPTON LLP; Daniel N. Yannuzzi

(57) ABSTRACT

Systems and methods of autonomously controlling a vehicle across the grip driving and drift driving operating ranges, are provided. The contemplated autonomous control can be effectuated using a closed-loop control system. In some embodiments, closed-loop control may be accomplished by deriving control laws involving sideslip angle, yaw rate, wheel speed, and other vehicle states. These control laws may be used to control the vehicle in a stable drift condition.

21 Claims, 8 Drawing Sheets

(51) Int. Cl.

| | |
|---|---|
| B60W 10/02 | (2006.01) |
| B60W 10/04 | (2006.01) |
| B60W 10/18 | (2012.01) |
| B60W 10/20 | (2006.01) |
| B60W 50/02 | (2012.01) |
| B60W 50/029 | (2012.01) |
| G06N 20/00 | (2019.01) |

(56) References Cited

U.S. PATENT DOCUMENTS

| | | | | |
|---|---|---|---|---|
| 9,764,742 | B1 * | 9/2017 | Goldfarb | G07C 5/008 |
| 10,513,254 | B2 * | 12/2019 | Fodor | B60W 10/06 |
| 10,773,708 | B2 | 9/2020 | Ruybal | |
| 2009/0186535 | A1 * | 7/2009 | Sullivan | B60F 3/0007 |
| | | | | 440/12.66 |
| 2011/0264349 | A1 * | 10/2011 | Okubo | B60T 8/175 |
| | | | | 701/71 |
| 2015/0275786 | A1 | 10/2015 | Jin | |
| 2015/0291027 | A1 * | 10/2015 | Strasser | G01C 21/3469 |
| | | | | 701/69 |
| 2018/0257631 | A1 * | 9/2018 | Fodor | B60W 10/18 |
| 2018/0319402 | A1 * | 11/2018 | Mills | B60W 10/04 |
| 2019/0176801 | A1 * | 6/2019 | Ruybal | B60K 6/52 |
| 2019/0188602 | A1 * | 6/2019 | Kwant | G06N 3/08 |
| 2020/0290625 | A1 | 9/2020 | Berntorp | |
| 2021/0078585 | A1 * | 3/2021 | Collins | B60W 30/045 |
| 2021/0182632 | A1 * | 6/2021 | Choi | G01S 15/931 |
| 2022/0289196 | A1 * | 9/2022 | Pettersson | B60W 10/184 |
| 2022/0396259 | A1 * | 12/2022 | Balachandran | B60W 10/20 |
| 2023/0057597 | A1 * | 2/2023 | Oguro | B60L 15/2036 |

OTHER PUBLICATIONS

Handbrake Turn, Jul. 19, 2023, Wikipedia, https://en.wikipedia.org/wiki/Handbrake_turn#:~:text=Whereas%20pulling%20the%20handbrake%20is,require%20a%20three%2Dpoint%20turn (Year: 2023) (Year: 2023).*

Cai et al., "High-speed Autonomous Drifting with Deep Reinforcement Learning," arXiv:2001.01377v1 [cs.RO] Jan. 6, 2020, 8 pages.

Gonzales, "Planning and Control of Drift Maneuvers with the Berkley Autonomous Race Car," UC Berkeley, UC Berkeley Electronic Theses and Dissertations, 2018, 146 pages.

Zhang et al., "Drift Control for Cornering Maneuver of Autonomous Vehicles," Mechatronics 54 (2018) pp. 167-174, journal homepage: www.elsevier.com/locate/mechatronics.

* cited by examiner

500     RECEIVE VEHICLE STATE AND ENVIRONMENTAL SITUATION DATA

502     DETERMINE A DRIVER PREFERENCE FOR DRIFTING

504     SELECT A DRIVING MODE (GRIP OR DRIFT)

506     PLAN A TRAJECTORY IN THE SELECTED DRIVING MODE

508     EXECUTE THE PLANNED TRAJECTORY

AUTOMATED CONTROL ARCHITECTURE THAT HANDLES BOTH GRIP DRIVING AND SLIDING

TECHNICAL FIELD

The present disclosure relates generally to automotive systems and technologies, and more particularly, some embodiments relate to automated systems which control a vehicle during grip driving and drift driving.

DESCRIPTION OF RELATED ART

Current technologies typically consider automated or autonomous control under two primary operating ranges/ modes: (1) grip driving (the vehicle operating range/mode where a tire can produce force up to and including the peak force available due to friction); and (2) drift driving (the vehicle operating range/mode where the tire is beyond a peak force limit).

BRIEF SUMMARY OF THE DISCLOSURE

According to various embodiments of the disclosed technology, a method for autonomously transitioning a vehicle from grip driving to drift driving, is provided. The method, in accordance with embodiments of the technology disclosed herein comprises: (1) receiving, by a closed-loop electronic control unit (ECU) in a vehicle, first data associated with a current operational state of the vehicle and second data associated with a contextual environment in which the vehicle operates; (2) determining, by the closed-loop ECU, a driver preference for operating the vehicle in a drift driving mode; and (3) based on the first data associated with the current operational state of the vehicle, the second data associated with the contextual environment in which the vehicle operates, and the driver preference for operating the vehicle in a drift driving mode, determining, by the closed-loop ECU, to transition the vehicle from a grip driving mode to a drift driving mode. In some embodiments, the method may further comprise effectuating, by the closed-loop ECU, the transition from the grip driving mode to the drift driving mode.

In various embodiments, another method for autonomously transitioning a vehicle from grip driving to drift driving, is provided. The method, in accordance with embodiments of the technology disclosed herein comprises: (1) receiving, by a closed-loop ECU in a vehicle, first data associated with a current operational state of the vehicle and second data associated with a contextual environment in which the vehicle operates; (2) determining, by the closed-loop ECU, a driver preference for operating the vehicle in a drift driving mode; (3) based on the first data associated with the current operational state of the vehicle, determining, by the closed-loop ECU, that the vehicle is operating in a grip driving mode; (4) based on the first data associated with the current operational state of the vehicle, the second data associated with the contextual environment in which the vehicle operates, and the driver preference for operating the vehicle in a drift driving mode, planning, by the closed-loop ECU, a vehicle trajectory which includes a transition from the grip driving mode to a drift driving mode; and (5) executing, by the closed-loop ECU, the planned vehicle trajectory. In some embodiments, executing the planned vehicle trajectory may comprise (1) receiving, by the closed-loop ECU, an error signal; and (2) converting, by the closed-loop ECU, the error signal into one or more control signals designed to reduce error. In these embodiments, the error may be the difference between the planned vehicle trajectory and a sensed vehicle trajectory, and the error signal may be a function of the error.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
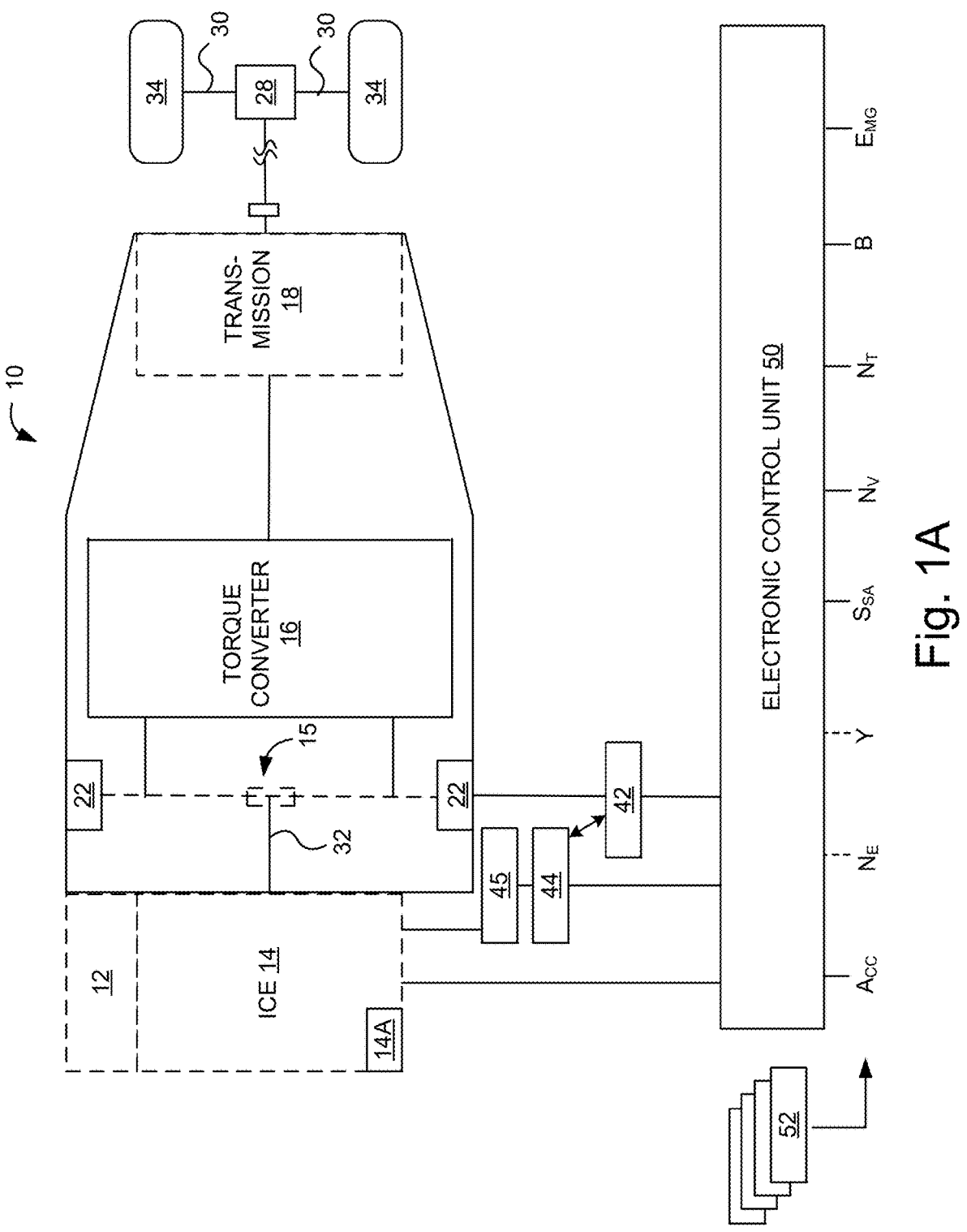
FIG. 1A illustrates an example of a vehicle with which systems and methods for autonomous control across the drift driving and grip driving ranges can be implemented in accordance with one embodiment of the present disclosure.

The figures are not exhaustive and do not limit the present disclosure to the precise form disclosed.

DETAILED DESCRIPTION

Drifting/sliding/slipping occurs when the tires of a vehicle lose traction with the road surface. As alluded to above, there is a limit to the amount of lateral frictional force a vehicle's tires can exert on a road surface. Past this peak force limit, the tires will saturate (i.e. lose traction with the road), and begin to drift/slip. Drifting has a reputation for being dangerous because both human drivers and autonomous control technologies have trouble managing the dual objectives of path tracking (i.e. controlling where the vehicle is going), and restoring stability (i.e. restoring traction between the tires and the road, and/or stopping the vehicle from rotating about its yaw axis) while drifting. For this reason, most automated technologies look primarily at the grip driving range and try to limit the vehicle's performance so that the tires will always be below their peak force capability. By limiting the vehicle's performance in this way, the vehicle will stay within the grip driving range and autonomous control algorithms that work in that range can be applied.

However, in certain situations, a driver may want to drift. For example, many race car drivers intentionally cause a vehicle to drift in order to navigate sharp turns at peak efficiency. While drifting, the vehicle will often point in a different direction than it is moving. Put another way, the racer operates the vehicle at a high sideslip angle (i.e. the angle between the direction the vehicle is pointing, and the vehicle's linear velocity vector). In this way, the racer is able to navigate the turn faster than would be possible in the grip driving range. Outside the racing/recreation context, in certain situations, drift driving may be the safest way to navigate sudden obstacles and slick road conditions. For example, drift driving may be required to make a sudden lane shift to avoid a deer that has run onto the road.

Accordingly, embodiments of the technology disclosed herein are directed towards systems and methods of autonomously controlling a vehicle across the grip driving and drift driving ranges (i.e. during grip driving, drift driving, and transitions between the two). The contemplated autonomous control can be effectuated using a closed-loop control system. In some embodiments, closed-loop control may be accomplished by deriving control laws (i.e. algorithms that determine the desired excitation for a closed-loop system based on the error signal) involving sideslip angle, yaw rate, wheel speed, and other vehicle states. These control laws may be used to control the vehicle in a stable drift condition (i.e. the range of vehicle states where a vehicle is controllable while drifting). In certain embodiments, the closed-loop control system may use non-linear control theory. In other embodiments, the closed-loop control system may use Model Predictive Control (MPC).

It should be understood that while a few autonomous control technologies consider controlling a vehicle while drifting, most that do focus on controlling a vehicle after it has started drifting, and look to get the vehicle back to grip driving as fast as possible. Among the select few autonomous control technologies which contemplate an intentional transition from grip driving to drift driving, none utilize closed-loop controllers across the entire grip driving and drift driving ranges. Rather, conventional/existing autonomous control technologies are premised on open-loop control for drift driving. In particular, an open-loop system is a control system in which the controlling action does not depend on the generated output of the system. Put another way, there is no feedback loop in an open-loop control system. Thus, unlike a closed-loop control system, an open-loop system does not track the error between generated output and desired output, and is unable to drive that error to zero. Accordingly, open-loop drift control technologies are less robust to handling disturbances (e.g. friction differences in a road surface) than embodiments of the disclosed technology, which utilize closed-loop control.

As alluded to above, a closed-loop control system (a.k.a. a feedback control system), such as that implemented in accordance with various embodiments, is a type of control system in which the controlling action depends, in part, on the generated output of the system. More specifically, in a closed-loop control system, part of the generated output, (i.e. the feedback signal; which may be the output signal itself, or some function of the output), is returned to the reference input via a feedback loop. In this way, the generated output of the system is compared to the desired output/reference input. For example, a closed-loop system may generate an error signal, which is the difference between the reference input signal and the feedback signal. This error signal is fed to the system controller, which converts it into a control signal designed to reduce the error, thus driving the generated output of the system towards the desired output.

Due to their closed-loop design, embodiments of the disclosed technology are more robust than other control systems, allowing them to account for external disturbances such as uncertain road conditions (e.g. changes in friction, bank, grade, etc.) and changing vehicle properties (e.g. tire cornering stiffness, weight distribution, etc.). In addition, these embodiments are able to decide in real time whether to transition from grip driving to drift driving, or vice versa. Moreover, because the transition from grip driving to drift driving (i.e. drift initiation) is performed using closed-loop controls, the system is able prevent the vehicle from over-rotating and thus spinning out of control.

In some embodiments, a single closed-loop controller may control a vehicle across the grip driving and drift driving ranges. In other embodiments, grip driving and drift driving may be controlled by separate closed-loop controllers, i.e. a grip driving controller and a drift driving controller, where a third closed-loop controller manages transitions between the grip driving controller and the drift driving controller.

As will be discussed in greater detail below, embodiments of the disclosed technology understand which regions in a vehicle state space are best for either grip driving and drift driving, based in part, on machine learning models which learn from expert human drivers. Additionally, the unified closed-loop approach utilized by embodiments of the disclosed technology allows for a clear/stable transition between grip driving and drift driving.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1A. Although the example described with reference to FIG. 1A is a hybrid type of vehicle, the systems and methods for autonomously controlling a vehicle across the grip driving and drift driving operating ranges can be implemented in other types of vehicle including gasoline- or diesel-powered vehicles, fuel-cell vehicles, electric vehicles, or other vehicles.

FIG. 1A illustrates a drive system of a vehicle 10 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 10 may be driven/powered with either or both of internal combustion engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses internal combustion engine 14 and the motor(s) 22 as the sources of motive power. In the engine-only and HEV travel modes, vehicle 10 relies on the motive force generated at least by internal combustion engine 14, and a clutch 15 may be included to engage internal combustion engine 14. In the EV travel mode, vehicle 10 is powered by the motive force generated by motor 22 while internal combustion engine 14 may be stopped and clutch 15 disengaged.

Internal combustion engine 14 can be an internal combustion engine such as a gasoline, diesel or similarly powered engine in which fuel is injected into and combusted in a combustion chamber. A cooling system 12 can be provided to cool the internal combustion engine 14 such as, for example, by removing excess heat from internal combustion engine 14. For example, cooling system 12 can be implemented to include a radiator, a water pump and a series of cooling channels. In operation, the water pump circulates coolant through the internal combustion engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of internal combustion engine 14. In other applications, either or both the water pump and the fan may be operated by electric current such as from battery 44.

An output control circuit 14A may be provided to control drive (output torque) of internal combustion engine 14. Output control circuit 14A may include a throttle actuator to control an electronic throttle valve that controls fuel injection, an ignition device that controls ignition timing, and the like. Output control circuit 14A may execute output control of internal combustion engine 14 according to a command control signal(s) supplied from an electronic control unit 50, described below. Such output control can include, for example, throttle control, fuel injection control, and ignition timing control. Throttle commands from a driver of vehicle 10 may be communicated by wire to electronic control unit 50 via an accelerator pedal position sensor attached to the accelerator pedal (not pictured). The accelerator pedal position sensor may be one of sensors 52, described below. As will be described below, electronic control unit 50 may send control signals to the throttle actuator in order to effectuate a transition from grip driving to drift driving (i.e. initiate a drift). For example, control signals sent to the throttle actuator may include instructions to accelerate into a turn at a high speed, and then release the throttle while increasing steering in order to transfer weight from the rear tires. This driving maneuver, known as a throttle lift, may be used to break traction between the rear tires of vehicle 10 and the road's surface.

Motor 22 can also be used to provide motive power in vehicle 10 and may be powered electrically via a battery 44. More specifically, motor 22 can be powered by battery 44 to generate motive force to move the vehicle and adjust vehicle speed. Motor 22 can also function as a generator to generate electrical power such as, when coasting or braking. Motor 22 may be connected to battery 44 via an inverter 42. Battery 44 may also be used to power other electrical or electronic systems in the vehicle. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from internal combustion engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage internal combustion engine 14 from the drivetrain of the vehicle. In the illustrated example, a crankshaft 32, which is an output member of internal combustion engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from internal combustion engine 14 is not delivered to the torque converter 16. In a slip engagement state, clutch 15 is engaged, and motive power is provided to torque converter 16 according to a torque capacity (transmission torque) of the clutch 15.

Clutch 15 may be controlled using a clutch-by-wire system. In this system, the engagement of the clutch may be controlled by a clutch actuator (not pictured). Electronic control unit 50 may control the clutch actuator. Clutch commands may be communicated from the driver of vehicle 10 to electronic control unit 50 via a clutch pedal position sensor positioned on the clutch pedal of vehicle 10. In some embodiments, this sensor may be one of sensors 52. As will be described below, electronic control unit 50 may send control signals to the clutch actuator in order to effectuate a transition from grip driving to drift driving (i.e. initiate a drift). For example, control signals sent to the clutch actuator may include instructions to disengage and then rapidly reengage the clutch in order jolt the driveline of vehicle 10, thereby breaking traction between the tires of vehicle 10 and the road surface. This drift initiation maneuver, also known as a "clutch-kick" may be performed in combination with steering and increased throttle, in order to initiate a drift.

Vehicle 10 may also include a steering-by-wire system (not pictured). In this system, a steering actuator may control the direction of wheels 34. Electronic control unit 50 may control the steering actuator. Steering commands may be communicated from the driver of vehicle 10 to electronic control unit 10 via a steering angle sensor positioned on the steering wheel of vehicle 10. As will be described below, electronic control unit 50 may send control signals to the steering actuator in order to effectuate a transition from grip driving to drift driving (i.e. initiate a drift).

Vehicle 10 may further include a brake-by-wire system (not pictured). In this system, one or more brake actuators may control the application of brakes to wheels 34. Electronic control unit 50 may control the brake actuator(s). Braking commands may be communicated from the driver of vehicle 10 to electronic control unit 50 via a brake pedal position sensor positioned on the brake pedal of vehicle 10. In some embodiments, vehicle 10 may also include a hand brake/parking brake which is connected by wire to electronic control unit 50 in a similar fashion. As will be described below, electronic control unit 50 may send control signals to one or more brake actuators in order to effectuate a transition from grip driving to drift driving (i.e. initiate a drift). For example, control signals sent to a brake actuator may include instructions to apply the parking brake when steering into a turn in order to lock the rear wheels of vehicle 10, thereby breaking traction between the rear tires and the road surface. This drift initiation technique is known as a "handbrake turn." In some situations, electronic control unit 50 may send control signals to the clutch actuator with instructions to briefly disengage the clutch during the handbrake turn in order to disconnect the rear wheels of vehicle 10 from engine power.

As alluded to above, vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. As will be discussed in greater detail below, electric control unit 50 may be used to autonomously control vehicle 10 during grip driving, drift driving, and transitions between the two driving modes. Electronic control unit 50 can include a plurality of electronic control units such as, for example, a first closed-loop control unit for grip driving and a second closed-loop control unit for drift driving. In some embodiments, the control units for grip driving and drift driving may operate independently from each other, and a third closed-loop control unit may manage the transition between the two driving modes. In other embodiments, electronic control unit 50 may comprise a single closed-loop electronic control unit which controls grip driving, drift driving, and transitions between the two.

As further examples, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1A, electronic control unit 50 receives information from a plurality of sensors included in vehicle 10. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), yaw rate of the vehicle, Y (e.g. the angular velocity of the vehicle around its yaw axis), sideslip angle of the vehicle, $S_{SA}$ (e.g. the angle between the direction the vehicle is pointing and the vehicle's linear velocity vector), and vehicle speed, $N_V$. These may also include torque converter 16 output, $N_T$ (e.g., output amps indicative of motor output), and brake operation amount/pressure, B. Accordingly, vehicle 10 can include a plurality of sensors 52 that can be used to detect various conditions internal or external to the vehicle and provide sensed conditions to engine control unit 50 (which, again, may be implemented as one or a plurality of individual control circuits).

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 1B:
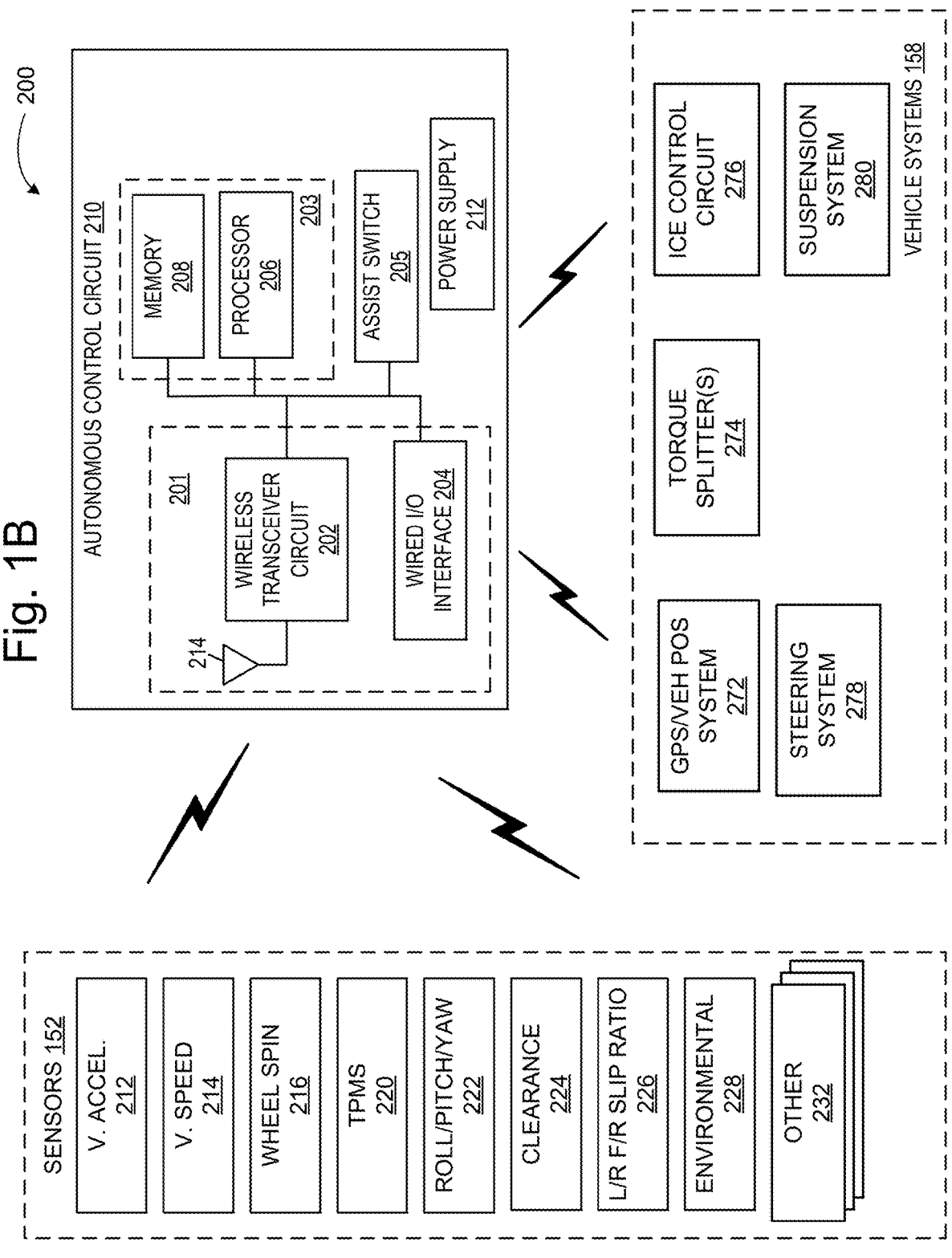
FIG. 1B illustrates an example architecture for an autonomous control system in the vehicle from FIG. 1A.

FIG. 1B illustrates an example architecture for autonomously controlling a vehicle across the grip driving and drift driving operating ranges in accordance with one embodiment of the systems and methods described herein. Referring now to FIG. 1B, in this example, autonomous control system 200 includes an autonomous control circuit 210, a plurality of sensors 152, and a plurality of vehicle systems 158. Sensors 152 and vehicle systems 158 can communicate with autonomous control circuit 210 via a wired or wireless communication interface. Although sensors 152 and vehicle systems 158 are depicted as communicating with autonomous control circuit 210, they can also communicate with each other as well as with other vehicle systems. Autonomous control circuit 210 can be implemented as an ECU or as part of an ECU such as, for example electronic control unit 50. In other embodiments, autonomous control circuit 210 can be implemented independently of the ECU.

Autonomous control circuit 210 in this example includes a communication circuit 201, a decision circuit 203 (including a processor 206 and memory 208 in this example) and a power supply 212. Components of autonomous control circuit 210 are illustrated as communicating with each other via a data bus, although other communication in interfaces can be included. Autonomous control circuit 210 in this example also includes a manual assist switch 205 that can be operated by the user to manually select the assist/autonomous control mode.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. As will be discussed below, memory 208 may be used to store vehicle state spaces (e.g. graphs or matrices which represent operational states of the vehicle) which indicate whether vehicle 10 is in a grip driving range or a drift driving range. Memory 208, can be made up of one or more modules of one or more different types of memory, and may be configured to store data and other information as well as operational instructions that may be used by the processor 206 to autonomous control circuit 210.

Although the example of FIG. 1B is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up autonomous control circuit 210.

Communication circuit 201 may include either or both a wireless transceiver circuit 202 with an associated antenna 214 and a wired I/O interface 204 with an associated hardwired data port (not illustrated). As this example illustrates, communications with autonomous control circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by autonomous control circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or not otherwise be included on a standard vehicle 10 with which autonomous control system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of autonomous control system 200. For example, there may be additional sensors for detecting and/or computing sideslip velocities, sideslip angles, percent sideslip, frictional forces, degree of steer, heading, trajectory, front tire slip angle corresponding to full tire saturation, rear tire slip angle corresponding to full tire saturation, maximum stable steering angle given speed/friction, gravitational constant, coefficient of friction between vehicle 10 tires and roadway, distance from center of gravity of vehicle 10 to front axle, distance from center of gravity of vehicle 10 to rear axle, total mass of vehicle 10, total longitudinal force, rear longitudinal force, front longitudinal force, total lateral force, rear lateral force, front lateral force, longitudinal speed, lateral speed, longitudinal acceleration, brake engagement, steering wheel position, time derivatives of steering wheel position, throttle, time derivatives of throttle, gear, exhaust, revolutions per minutes, mileage, emissions, and/or other operational parameters of vehicle 10.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 that can control distribution of power among the vehicle wheels such as, for example, by controlling front/rear and left/right torque split; engine control circuits 276 to control the operation of engine (e.g. internal combustion engine 14); steering systems 278 to turn the wheels of vehicle 10; suspension system 280 such as, for example, an adjustable-height air suspension system, and other vehicle systems. Vehicle systems 158 may also include the brake-by-wire and clutch-by-wire systems described in conjunction with FIG. 1A.

During operation, autonomous control circuit 210 can receive information from various vehicle sensors to determine whether a particular trajectory path should be executed in grip mode or drift mode. Communication circuit 201 can be used to transmit and receive information between autonomous controls circuit 210 and sensors 152, and autonomous controls circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 used to determine whether vehicle 10 should be operated in grip mode or drift mode. Additionally, communication circuit 201 can be used to send an activation signal or other activation information to various vehicle systems 158 as part of executing a trajectory path in grip mode or drift mode. For example, as described in more detail below, communication circuit 201 can be used to send signals to, for example, one or more of: torque splitters 274 to control front/rear torque split and left/right torque split; ICE control circuit 276 to, for example, control motor torque, motor speed of the various motors in the system; and steering system 278 to, for example, increase the slip angle of the rear tires. The decision regarding what action to take via these various vehicle systems 158 can be made based on the information detected by sensors 152. Examples of this are described in more detail below.

Figure 2:
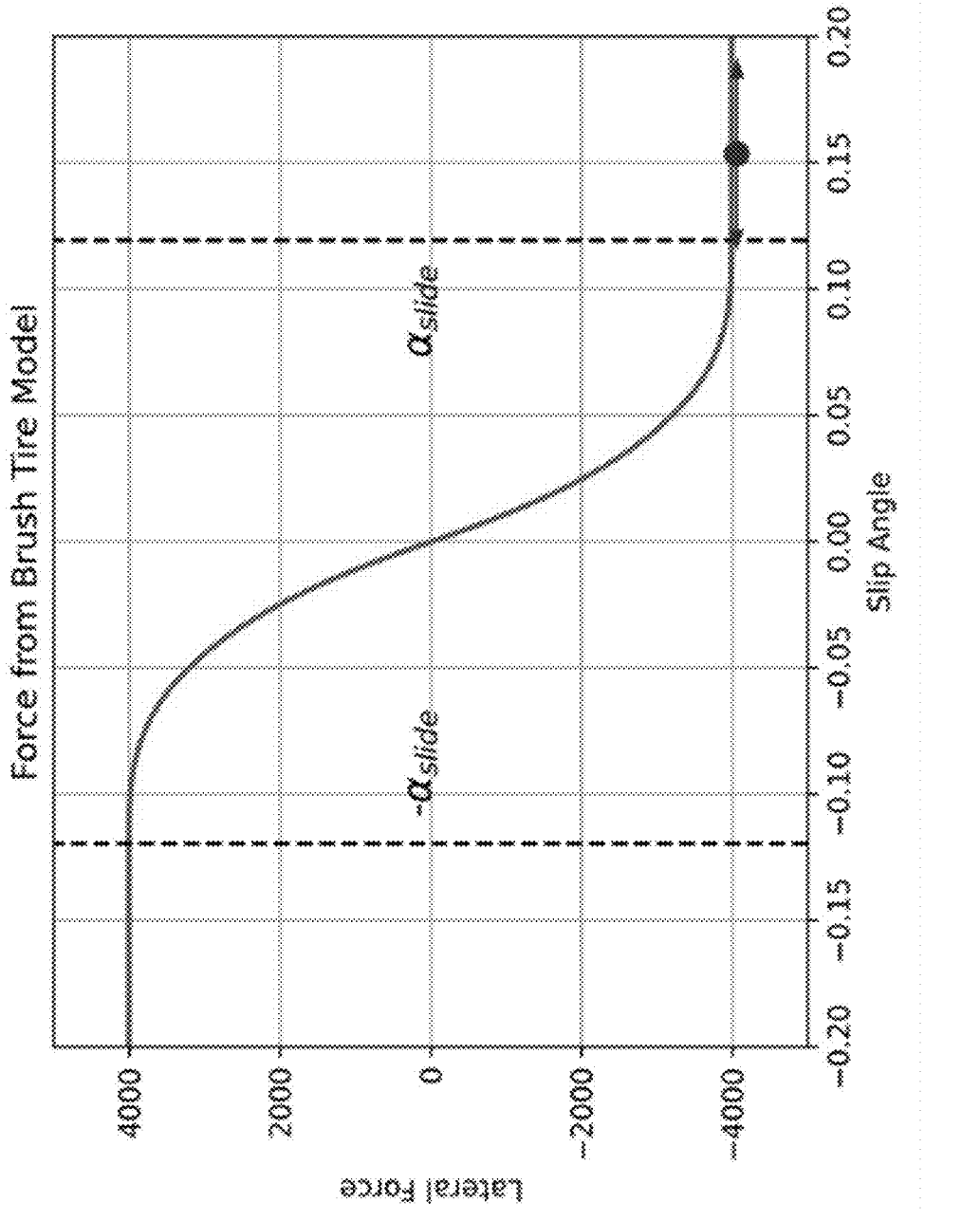
FIG. 2 is a graph illustrating an example relationship between the lateral force (or cornering force) experienced by a vehicle's rear tires during driving, and the slip angle of the tires.

FIG. 2 is a graph illustrating an example relationship between the lateral force (or cornering force) experienced by a vehicle's rear tires during driving, and the slip angle of the tires. Similar to the sideslip angle of a vehicle, the slip angle of a tire is the angle between the tire's linear velocity vector and the direction in which the tire is pointing. As the graph in FIG. 2 illustrates, within a certain range of slip angles (i.e. between $-\alpha_{side}$ and $\alpha_{side}$), as the magnitude of slip angle increases, the magnitude of lateral frictional force between the tires and the road increases as well. For example, as a vehicle negotiates a tight turn, the slip angle of its tires will increase, as will the lateral frictional force between its tires and the road surface. Of note, as FIG. 2 illustrates, there is a peak lateral force that a vehicle's tires can achieve before they begin to "slip." This is known as the tire's saturation point. Put another way, at $\alpha=|\alpha_{slide}|$, the cornering/lateral force saturates, and the tires lose traction with the road surface. For this reason, drift driving is often associated with high tire slip angles (as well as high vehicle sideslip angles), and cornering forces which exceed a vehicle's tire's peak lateral force limit.

Figure 3:
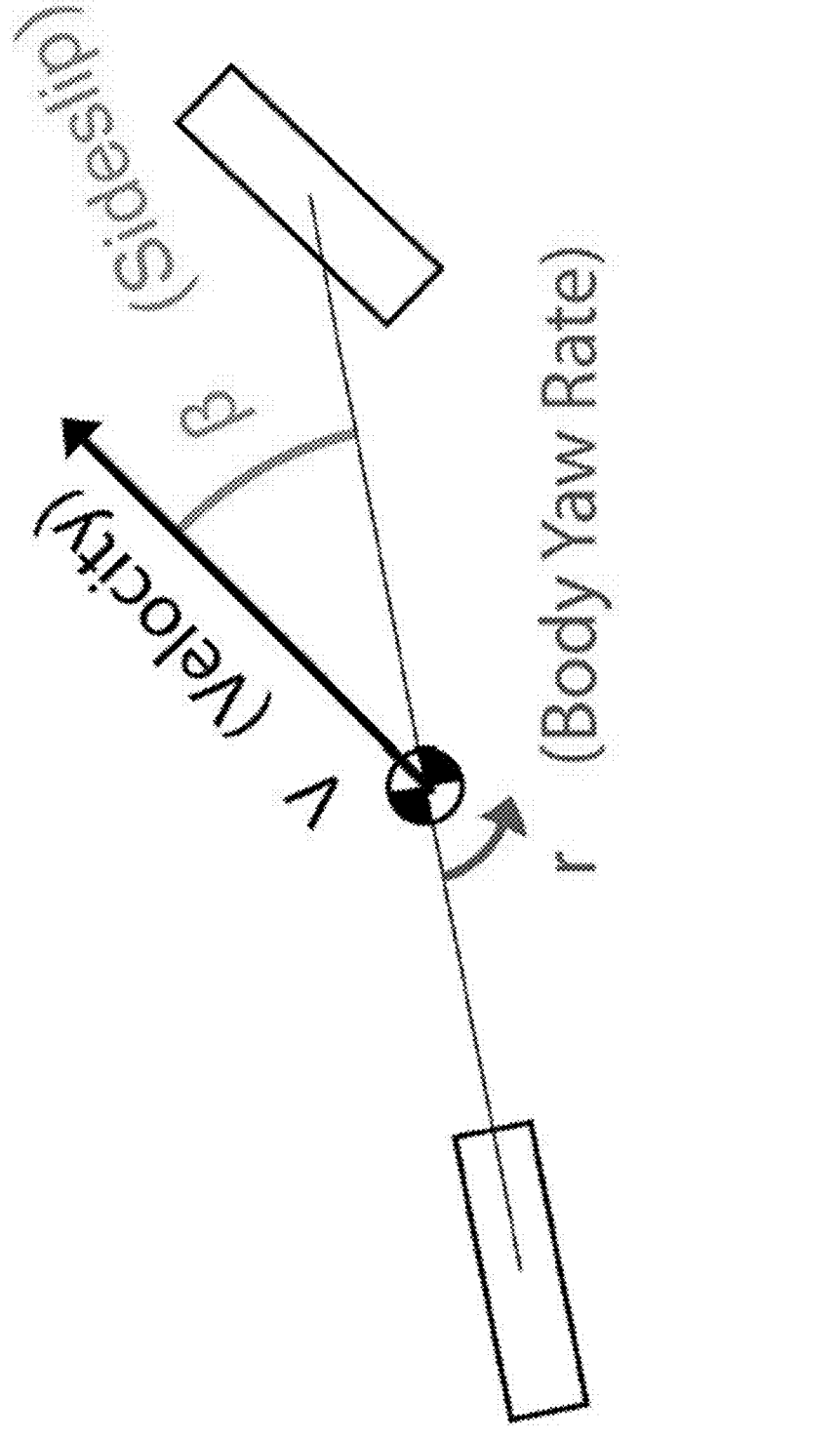
FIG. 3 is a diagram illustrating sideslip angle and yaw rate for an example vehicle body.

FIG. 3 is a diagram illustrating sideslip angle and yaw rate for an example vehicle body. As discussed earlier, the sideslip angle of a vehicle, $\beta$, is the angle between the direction the vehicle is pointing, and the vehicle's velocity vector. The yaw rate of a vehicle, r, is the angular velocity of the vehicle about its yaw axis.

Figure 4:
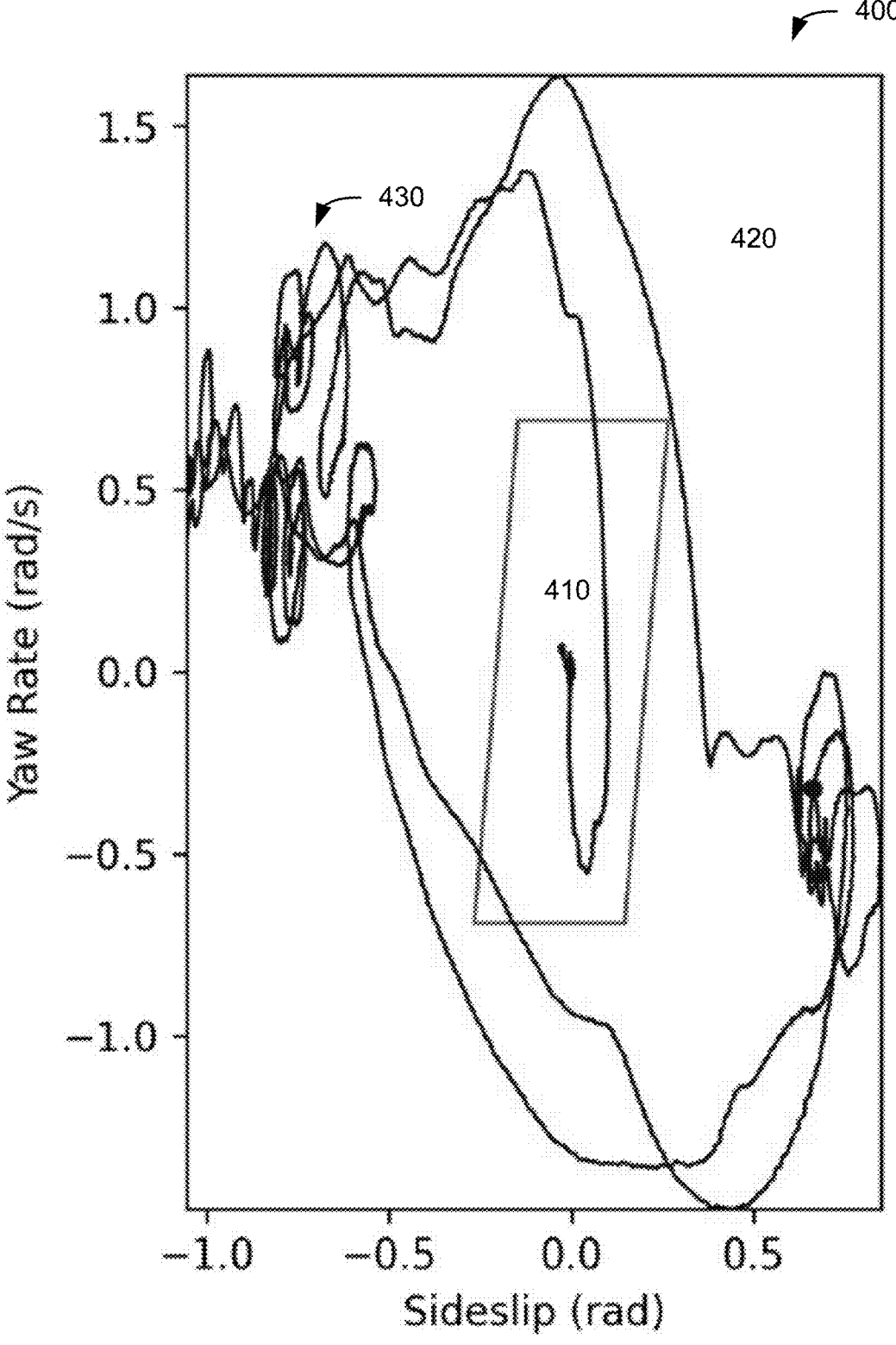
FIG. 4 is a graph illustrating an example vehicle state space.

FIG. 4 is a graph illustrating an example vehicle state space. A vehicle state space may be a graph or matrix which represents operation states of the vehicle. In the illustrated example, the vehicle state space 400 is two-dimensional: the y-axis plots yaw rate (rad/s), and the x-axis plots sideslip angle (rad). However, in other embodiments the vehicle state space may be n-dimensional, where each dimension represents a different operational parameter for the vehicle (e.g. yaw rate, sideslip angle, slip angle of the front tires, slip angle of the rear tires, vehicle speed, wheel speed, steering angle, time derivatives of steering angle, throttle, time derivatives of throttle, etc.).

Grip driving region 410 represents the region in vehicle state space 400 where a vehicle operates in the grip driving range. In the illustrated example, grip driving region 410 is a two-dimensional area, with sideslip angle and yaw rate as parameters. However, like vehicle state space 400, grip driving region 410 may be n dimensional.

As alluded to above, the grip driving range is the set of operating conditions where a vehicle's tires maintain traction with the road's surface. Put another way, the grip driving range is the set of operating conditions where a vehicle's tires can produce force up to and including their peak frictional force. In the illustrated example, a vehicle's operating conditions are defined by yaw rate and sideslip angle. Accordingly, if a vehicle's yaw rate and sideslip angle pair lie within grip driving region 410, that indicates that the vehicle is operating in the grip driving range (i.e. the vehicle's tires maintain traction with the road surface). For example, if a vehicle has a yaw rate of 0 rad/s, and a sideslip angle of 0 rad (i.e. driving in a straight line), that indicates that it is operating in the grip driving range.

Drift driving region 420 represents the drift driving region of vehicle state space 400. In the illustrated example, drift driving region 420 is a two-dimensional area, with sideslip angle and yaw rate as parameters. However, like vehicle state space 400, drift driving region 420 may be n dimensional.

As alluded to earlier, the drift driving range is the set of operating conditions where a vehicle's tires have broken traction with the road's surface. Put another way, the drift driving range is the set of operating conditions where a vehicle's tires are beyond their peak frictional force limit. In the illustrated example, a vehicle's operating conditions are defined by yaw rate and sideslip angle. Accordingly, if a vehicle's yaw rate and sideslip angle pair lie within drift driving region 420, that indicates that the vehicle is operating in the drift driving range. For example, if a vehicle has a yaw rate of 1.5 rad/s, and a sideslip angle of 0 rad, its yaw rate/sideslip pair lies inside drift driving region 420, indicating that it is operating in the drift driving range.

Finally, the boundary between grip driving region 410 and drift driving region 420 represents the set of operating conditions where a vehicle transitions from grip driving, to drift driving, or vice versa. As will be discussed below, an understanding of the boundary between the grip driving region and the drift driving region can be instructive for control operations such as drift initiation (i.e. transitioning a vehicle from grip driving, to drift driving).

Phase portrait 430 represents example data from a vehicle while driving. More specifically, phase portrait 430 plots the yaw rate and sideslip angle of the vehicle as it navigates around a test course. As can be seen in the figure, at times the vehicle operated in the grip driving range, but primarily the vehicle navigated the course by drifting. The high sideslip angles and yaw rates which characterize drift driving can be seen in the figure.

As alluded to above, vehicle state space 400, grip driving region 410, and drift driving region 420 may be stored in memory 208 of vehicle 10. In some embodiments, vehicle state space 400, grip driving region 410, and drift driving region 420 may be generated by analyzing driving data as a vehicle performs drift maneuvers. The vehicle state space and grip/drift driving regions may also be generated using learned information.

Figure 5:
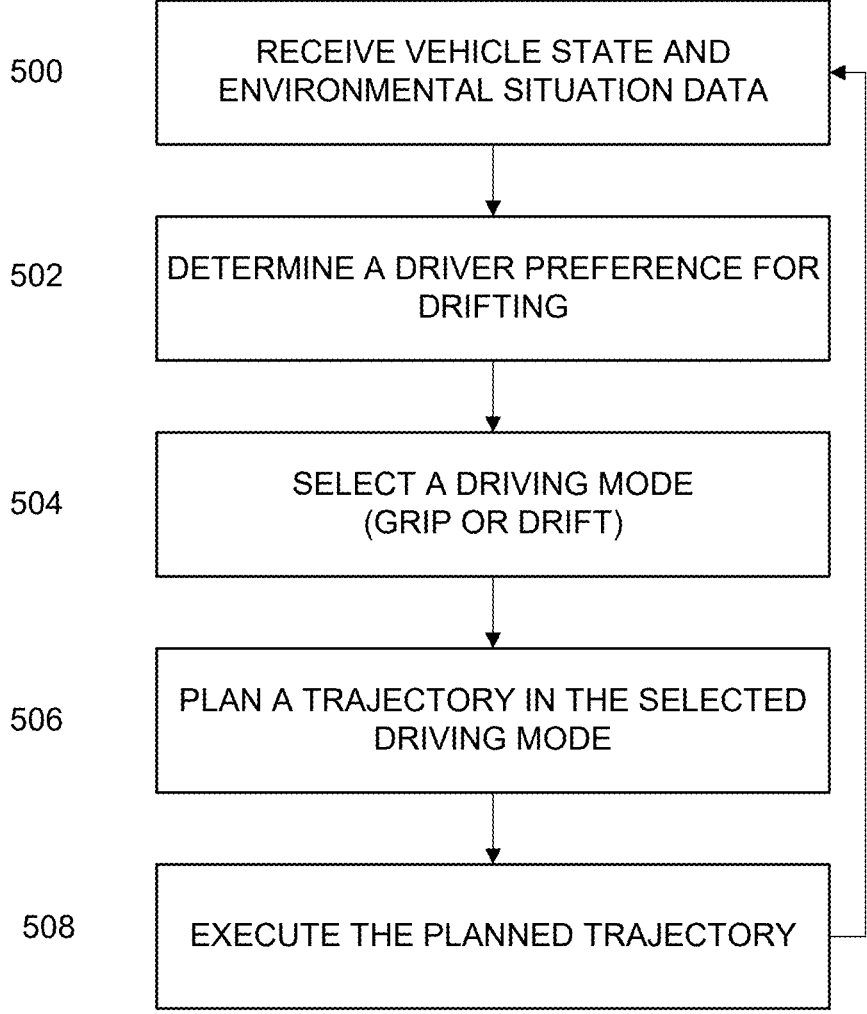
FIG. 5 is a flowchart illustrating example operations that can be performed to autonomously control a vehicle across the grip driving and drift driving ranges using a closed-loop control system.

FIG. 5 is a flowchart illustrating example operations that can be performed to autonomously control a vehicle across the grip driving and drift driving ranges using a closed-loop control system. Inherent in this closed-loop control system is the ability to determine in real time whether to operate a vehicle in a grip mode or a drift mode.

At operation 500, a closed-loop controller, e.g., autonomous control circuit 210, receives vehicle state data and environmental situation data. Vehicle state data is data associated with the contemporaneous operation state of a vehicle. Vehicle state data may include information such as vehicle speed, vehicle acceleration, yaw rate, sideslip velocities, sideslip angles, percent sideslip, frictional forces, degree of steer, heading, trajectory, front slip angle corresponding to full tire saturation, rear slip angle corresponding to full tire saturation, maximum stable steering angle given speed/friction, gravitational constant, coefficient of friction between tires and roadway, distance from center of gravity of the vehicle to its front axle, distance from center of gravity of the vehicle to its rear axle, total mass of the vehicle, total longitudinal force, rear longitudinal force, front longitudinal force, total lateral force, rear lateral force, front lateral force, longitudinal speed, lateral speed, longitudinal acceleration, brake engagement, steering wheel position, time derivatives of steering wheel position, throttle, time derivatives of throttle, gear, exhaust, revolutions per minutes, mileage, emissions, and/or other operational parameters the vehicle. In some embodiments, autonomous vehicle control circuit 210 may obtain vehicle state data from sensors 152 and GPS/VEH Position System 272. Environmental situation data is data associated with the contextual environment in which the vehicle operates. Environmental situation data may include information related to road features (e.g. road path, coefficient of friction between the road and tires, bank angle, number of lanes, etc.), moving and/or stationary objects in proximity to the vehicle's predicted trajectory (e.g. other vehicles, fallen trees, deer, etc.), and ambient weather conditions. In some embodiments, autonomous vehicle control circuit 210 may obtain environmental situation data from sensors 152 and GPS/VEH Position System 272.

At operation 502, the closed-loop controller determines a driver preference for drift driving. In some embodiments, this determination may be made by retrieving preset driver preferences stored in memory, for example memory 208 of autonomous control circuit 210. For example, a driver of the vehicle may input their preference for drifting (e.g. high preference, medium preference, low preference) before taking a vehicle out on a test track. In another example, a manufacturer may preset a driver preference for drifting in the vehicle (e.g. a preference for drifting only when needed to avoid collisions). In this example, a driver of the vehicle may be able to modify the preset driver preference, for example, by selecting a sport mode which has a higher preference for drifting. In some embodiments, the closed-loop controller may learn a driver's preference for drift driving based on past driving experience in the vehicle. For example, the closed-loop controller may learn that a particular driver has attempted to drift more frequently in successive trips to a test track. This may indicate the driver's increased preference for drifting.

At operation 504, the closed-loop controller selects a driving mode (grip or drift) based on the vehicle state data, the environmental situation data, and the driver preference for drifting. In some embodiments, the closed-loop controller may make this determination using machine learning models trained by expert human drivers. For example, these trained machine learned models may be used to determine that drift driving is the best way to meet a driving objective (e.g. collision avoidance) based on vehicle state (e.g. vehicle speed, vehicle trajectory, sideslip angle, rear tire slip angle, rear tire slip angle corresponding to full tire saturation, etc.) environmental situation (location of obstacles relative to the vehicle's trajectory, road path, coefficient of friction between the tires and road, etc.), and the driver preference for drifting (e.g. drift when needed to avoid collisions). In certain embodiments, the selection of driving mode may be based on an understanding of which driving mode performs best in a particular region of a vehicle state space. Put another way, a vehicle state space may be partitioned into regions where grip driving is known to perform better, and regions where drift driving is known to perform better. In certain embodiments, data produced by expert human drivers may form a basis for this understanding. For example, vehicle state data related to driver inputs (e.g. steering angle, time derivatives of steering angle, throttle, time derivates of throttle, etc.) may be tracked while an expert driver navigates a test course. Accordingly, this data may be used to partition a vehicle state space defined by driving inputs into regions which are known to be suited for drift driving control, and regions which are known to be suited for grip driving control.

At operation 506, the closed-loop controller plans a trajectory in the selected driving mode. In certain situations, the planned trajectory may involve a transition from grip driving to drift driving, or vice versa. In these situations, knowledge of the boundary between the grip driving region and the drift driving region of a vehicle state space may be instructive. Put another way, the closed-loop controller may use its knowledge of the boundary between the grip driving region and the drift driving region to plan a transition from grip driving to drift driving (i.e. initiating a drift), or vice versa.

At operation 508, the closed-loop controller executes the planned trajectory using the appropriate control laws/algorithms for the operating range the trajectory is planned in. As discussed above, control laws involving sideslip angle, yaw rate, wheel speed, and other vehicle states may be used to determine the desired excitation for the closed-loop system based on the error signal received by the closed-loop controller. Put another way, these control laws may be used to convert the error signal received by the closed-loop controller into control signals which reduce error to zero. As alluded to above, the error signal may be some function of the difference between the planned trajectory, and the actual trajectory of the vehicle (which may be one sensed parameter of the vehicle state data obtained in operation 500). In certain embodiments, the closed-loop control system may use non-linear control theory to execute the planned trajectory. In other embodiments, the closed-loop control system may use Model Predictive Control (MPC).

In some embodiments, autonomous driving circuit 210 may execute the planned trajectory by sending control signals to vehicle systems 158. For example, if the planned path requires a transition to drift driving, autonomous control circuit 210 may transmit control signals to the throttle, steering, clutch, and brake actuators of vehicle 10 in order to initiate a drift. For example, as alluded to above, autonomous control circuit 210 may send control signals to the clutch actuator with instructions to disengage and then rapidly reengage the clutch in order jolt the driveline of vehicle 10, and break traction between the tires of vehicle 10 and the road surface. Simultaneously, autonomous control circuit may send control signals to the steering and throttle actuators with instructions to increase steering and throttle respectively. In this way, autonomous control circuit may effectuate a "clutch kick" in order to initiate a drift. Similarly, autonomous control circuit 210 may send control signals to the steering, throttle, brake, and clutch actuators in order to effectuate a "handbrake turn" in order to initiate a drift. As alluded to above, a handbrake turn is a drift initiation technique which involves rapidly applying a hand-brake/parking brake will steering into a turn. In some vehicles, executing a handbrake turn may also involve disengaging the clutch will applying the handbrake/parking brake. Finally, because these example operations illustrate a closed-loop system, the new vehicle state and environmental situation data associated with the executed/actual trajectory is fed back into the system at operation 500.

Figure 6:
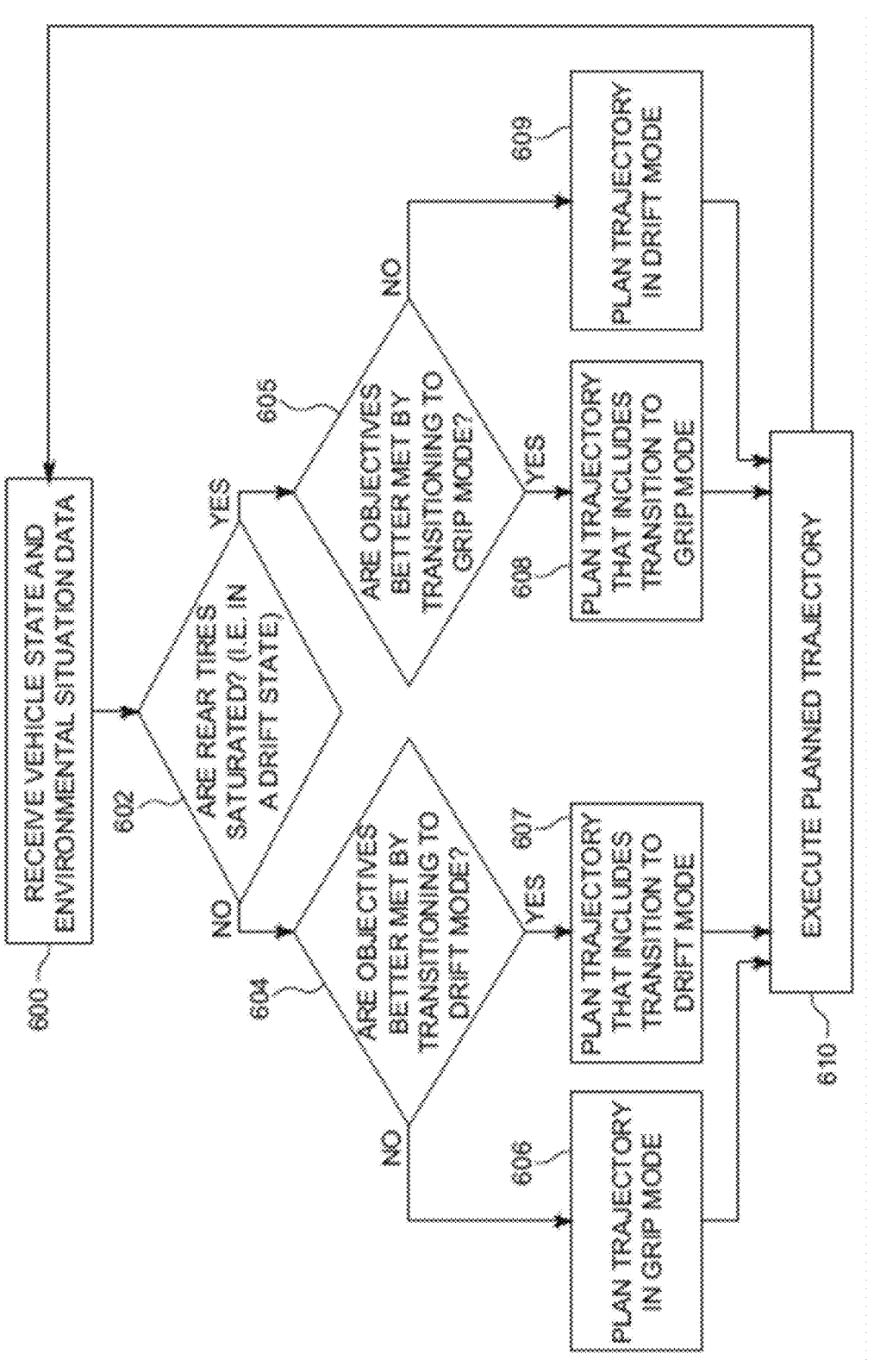
FIG. 6 is another flowchart illustrating example operations that can be performed to autonomously control a vehicle across the grip driving and drift driving ranges using a closed-loop control system.

FIG. 6 is another flowchart illustrating example operations that can be performed to autonomously control a vehicle across the grip driving and drift driving ranges using a closed-loop control system.

At operation 600, a closed-loop controller receives vehicle state data and environmental situation data. Here, vehicle state data and environmental situation data may be defined and received in the same/similar way as described in conjunction with operation 500 of FIG. 5.

At operation 602, the closed-loop controller determines whether the vehicle's rear tires are saturated (i.e. in a drift state). In some embodiments, this determination may be made by correlating sensed rear tire slip angle with a known rear tire slip angle corresponding to full tire saturation. In other embodiments, this determination may be made by correlating the received vehicle state data to a vehicle state space partitioned into grip driving regions and drift driving regions, such as vehicle state space 400.

If at operation 602 the closed-loop controller determines that the vehicle's rear tires are not saturated (i.e. not in a drift state), at operation 604 the closed-loop controller determines whether driving objectives are better met by transitioning to drift driving. Examples of driving objectives may include path tracking (i.e. maintaining a given trajectory), collision avoidance, maintaining vehicle controllability (i.e. keeping the vehicle in the range of operating conditions where it is controllable by an autonomous/assisted driving system), and satisfying a driver's preferences for drifting. As alluded to above, trained machine learning models may be used to determine that drift driving is the best way to meet a driving objective based on vehicle state, environmental situation, and the driver preference for drifting. For example, trained machine learning models may indicate that transitioning to drift driving is the best way to avoid a sudden obstacle in the road given the vehicle state, and a driver preference for drifting (e.g. when necessary to avoid a collision). As described above, in some embodiments, the determination to transition from grip driving to drift driving may be based on an understanding of which driving mode performs best in a particular region of a vehicle state space. Put another way, a vehicle state space may be partitioned into regions where grip driving is known to perform better, and regions where drift driving is known to perform better. In certain embodiments, data produced by expert human drivers may form a basis for this understanding. For example, vehicle state data related to driver inputs (e.g. steering angle, time derivatives of steering angle, throttle, time derivates of throttle, etc.) may be tracked while an expert driver navigates a test course. Accordingly, this data may be used to partition a vehicle state space defined by driving inputs into regions which are known to be suited for drift driving control.

If at operation 602 the closed-loop controller determines that the vehicle's rear tires are saturated (i.e. in a drift state), at operation 605 the closed-loop controller determines whether driving objectives (defined in the same/similar way as described in conjunction with operation 604) are better met by transitioning to grip driving. For example, the closed-loop controller may determine that transitioning to grip driving is the best way to maintain vehicle controllability and satisfy a driver's low preference for drifting. This determination may be made in the same/similar way as described in conjunction with operation 604.

If at operation 604, the closed-loop controller determines that driving objectives are better met by continued grip driving, at operation 606, the closed-loop controller plans a trajectory that involves continued drift driving.

If at operation 604, the closed-loop controller determines that driving objectives are better met by transitioning to drift driving, at operation 607, the closed-loop controller plans a trajectory that includes a transition to drift driving. Here, the closed-loop controller's knowledge of the boundary between the grip driving region and the drift driving region of a vehicle state space may be instructive. Put another way, the closed-loop controller may use its knowledge of the boundary between the grip driving region and the drift driving region to plan the transition from grip driving to drift driving (i.e. initiating a drift).

If at operation 605, the closed-loop controller determines that driving objectives are better met by transitioning to grip driving, at operation 608, the closed-loop controller plans a trajectory that includes a transition to grip driving. As with operation 607, the closed-loop controller may use its knowledge of the boundary between the grip driving and drift driving regions of a vehicle state space to plan this transition.

If at operation 605, the closed-loop controller determines that driving objectives are better met by continued drift driving, at operation 609, the closed-loop controller plans a trajectory that involves continued drift driving.

At operation 610, the closed-loop controller executes the planned trajectory in the same/similar way as described in conjunction with operation 508 of FIG. 5.

Figure 7:
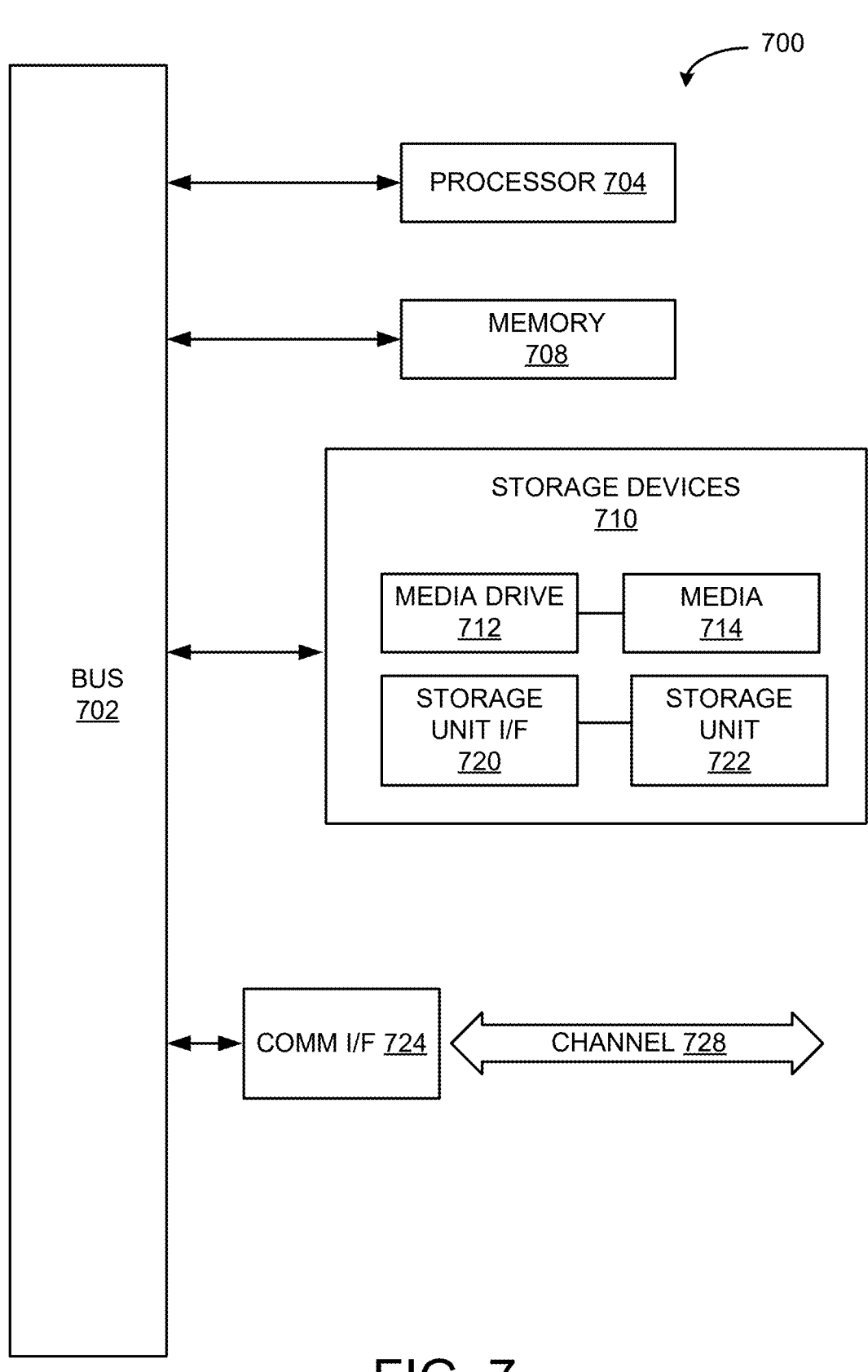
FIG. 7 illustrates an example computing system that may be used in implementing various features of embodiments of the disclosed technology.

Referring now to FIG. 7, computing system 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment, such as for example, one or more of the elements or circuits illustrated in FIGS. 1A and 1B and described herein. Computing system 700 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 700 might include, for example, one or more processors, controllers, control modules, or other processing devices, such as a processor 704. Processor 704 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 704 is connected to a bus 702, although any communication medium can be used to facilitate interaction with other components of computing system 700 or to communicate externally.

Computing system 700 might also include one or more memory modules, simply referred to herein as main memory 708. For example, in some embodiments random access memory (RAM) or other dynamic memory, might be used for storing information and instructions to be executed by processor 704. Main memory 708 might also be used for storing temporary variables or other intermediate information during execution of instructions to be executed by processor 704. Computing system 700 might likewise include a read only memory ("ROM") or other static storage device coupled to bus 602 for storing static information and instructions for processor 704.

The computing system 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), a flash drive, or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing system 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a flash drive and associated slot (for example, a USB drive), a PCMCIA slot and card, and other fixed or removable storage units 722 and interfaces 720 that allow software and data to be transferred from the storage unit 722 to computing system 700.

Computing system 700 might also include a communications interface 724. Communications interface 724 might be used to allow software and data to be transferred between computing system 700 and external devices. Examples of communications interface 724 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 700 to perform features or functions of the disclosed technology as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method comprising:

determining a preference of a driver of a vehicle for drift driving;

obtaining first data associated with a current operational state of the vehicle and second data associated with a contextual environment in which the vehicle operates; and based on the first data associated with the current operational state of the vehicle, the second data associated with the contextual environment in which the vehicle operates, and the determined preference for drift driving, determining to transition the vehicle from grip driving to drift driving, wherein determining to transition the vehicle from grip driving to drift driving comprises correlating the first data to a multi-dimensional graph or matrix of operational states of the vehicle partitioned into grip driving regions and drift driving regions.

2. The computer-implemented method of claim 1, further comprising:

effectuating the transition from grip driving to drift driving.

3. The computer-implemented method of claim 2, wherein the first data comprises a trajectory of the vehicle.

4. The computer-implemented method of claim 3, wherein effectuating the transition from grip driving to drift driving comprises:

planning a vehicle trajectory which includes a transition from grip driving to drift driving; and executing the planned vehicle trajectory.

5. The computer-implemented method of claim 4, wherein executing the planned vehicle trajectory comprises:

receiving an error signal; and converting the error signal into one or more control signals designed to reduce error.

6. The computer-implemented method of claim 5, wherein:

the error is a difference between the planned vehicle trajectory and vehicle trajectory determined based on the first data; and the error signal is a function of the error.

7. The computer-implemented method of claim 6, wherein determining to switch the vehicle from grip driving to drift driving is based, in part, on correlating the first data associated with the current operational state of the vehicle, the second data associated with the contextual environment in which the vehicle operates, and the driver preference for drift driving, to trained machine learning models.

8. The computer-implemented method of claim 1, wherein the first data further comprises sideslip angle of the vehicle, linear velocity of the vehicle and yaw rate of the vehicle.

9. The computer-implemented method of claim 1, wherein the second data comprises road path and location of objects in proximity to the vehicle.

10. The computer-implemented method of claim 1, wherein the second data associated with the contextual environment in which the vehicle operates comprises at least one of:

data related to structural features of a road the vehicle is traversing;

data related to objects in proximity of a predicted trajectory of the vehicle; or data related to ambient weather conditions in which the vehicle operates.

11. The computer-implemented method of claim 10, wherein the data related to the structural features of the road the vehicle is traversing comprises at least one of:

data related to a path of the road;

data related to a coefficient of friction between the vehicle's tires and a surface of the road; or data related bank angle of the road.

12. A computer-implemented method comprising:

receiving first data associated with a current operational state of a vehicle and second data associated with a contextual environment in which the vehicle operates;

based on the first data and the second data, planning a trajectory for the vehicle which involves a transition from grip driving to drift driving, wherein the planning comprises correlating the first data to a multi-dimensional graph or matrix of operational states of the vehicle partitioned into grip driving regions and drift driving regions; and executing the planned trajectory for the vehicle.

13. The computer-implemented method of claim 12, wherein the first data comprises a sensed trajectory of the vehicle.

14. The computer-implemented method of claim 13, wherein executing the planned trajectory for the vehicle comprises:

receiving an error signal; and converting the error signal into one or more control signal designed to reduce error.

15. The computer-implemented method of claim 14, wherein:

the error is a difference between the planned trajectory for the vehicle and the sensed trajectory of the vehicle; and the error signal is a function of the error.

16. The computer-implemented method of claim 15, wherein planning the trajectory for the vehicle which includes the transition from grip driving to drift driving is based, in part, on correlating the first data and the second data to trained machine learning models.

17. The computer-implemented method of claim 12, wherein the computer-implemented method is performed by a closed-loop ECU in the vehicle.

18. The computer-implemented method of claim 12, wherein:

the grip driving regions comprise operational state regions in which the vehicle is operated within a peak frictional force of the vehicle's tires; and the drift driving regions comprise operational state regions in which the vehicle is operated beyond the peak frictional force of the vehicle's tires.

19. A vehicle comprising:

one or more processors including machine executable instructions in non-transitory memory to cause the vehicle to:

receive a data associated with a current operational state of the vehicle;

determine to transition the vehicle from grip driving to drift driving by correlating the data to a multi-dimensional graph or matrix of operational states of the vehicle partitioned into grip driving regions in which the vehicle is operated within a peak frictional force of the vehicle's tires and drift driving regions in which the vehicle is operated beyond the peak frictional force of the vehicle's tires; and effectuate the transition between grip driving and drift driving by sending control signals to at least one of a steering-by-wire system, a throttle-by-wire system, a clutch-by-wire system, and a brake-by-wire system, each actualizing sent control signals.

20. The vehicle of claim 19, wherein the control signals sent to the clutch-by-wire system comprise instructions to disengage and then rapidly reengage the clutch in order to effectuate the transition between grip driving and drift driving.

21. The vehicle of claim 20, wherein the control signals sent to the brake-by-wire system comprise instructions to apply a parking brake while steering into a turn, in order to effectuate the transition between grip driving and drift driving.

* * * * *